Nov. 9, 1971        L. WIESNER ET AL        3,618,311
SYNCHRONIZED HOROLOGICAL SYSTEM
Filed Jan. 13, 1970                          5 Sheets-Sheet 1

INVENTORS
LEO WIESNER
EUGENE R. KEELER by
Davis, Hoxie, Faithfull & Hapgood
ATTORNEYS

United States Patent Office 3,618,311
Patented Nov. 9, 1971

3,618,311
SYNCHRONIZED HOROLOGICAL SYSTEM
Leo Wiesner, Kew Gardens, and Eugene R. Keeler, Suffern, N.Y., assignors to Timex Corporation
Continuation-in-part of abandoned application Ser. No. 807,293, Mar. 14, 1969. This application Jan. 13, 1970, Ser. No. 2,586
Int. Cl. G04c 3/04; H02k 33/18; H03k 3/08
U.S. Cl. 58—28    19 Claims

ABSTRACT OF THE DISCLOSURE

A horological instrument includes a high frequency time base, preferably a piezoelectric crystal oscillator. The frequency of the oscillator is reduced by dividing circuits. The output of the dividing circuits synchronizes an independent circuit which drives a low frequency oscillator. Preferably the system includes a single coil carried by the low frequency oscillator, which is a balance wheel and which moves through magnetic fields of alternative polarities.

---

This application is a continuation-in-part of the previously filed application Ser. No. 807,293, filed Mar. 14, 1969, entitled "Synchronized Horological System," which is commonly assigned and now abandoned.

The present invention relates to horology and more particularly to an electronic watch movement.

The historical goal of horology has been accurate timekeeping. Time standards have been developed which may be accurate to one part in twenty million, based upon astronomical observations. Even higher accuracy time standards have been proposed and built based upon gas absorption phenomena and radioactive emission. However, these precision instruments have been primarily laboratory instruments, large in size and extremely costly. In contrast, portable watches are much less accurate.

The most accurate watches are still those that are based upon mechanically, or motion, actuated mainsprings which, through a gear train and escapement, drive rotatable hands. But such watches, termed "chronometers," are costly and relatively fragile. Electronic watches, employing an oscillator having a frequency of 300 to 400 Hz., have been constructed. But they are generally subject to position error, that is, their timekeeping depends upon the position of the watch in relationship to the earth's gravitational field. In addition, such electronic watches have also been fragile and costly. They require a delicate pawl system to transfer the rapid motion of the mechanical vibrator to gears of the watch. There have been various suggestions to replace the pawl system, such as having the motion of the mechanical oscillator interact with a transducer to provide a pulse which either directly, or through dividing circuits, operates a motor. However, that system requires two motors—first the mechanical oscillator and second the motor to drive the gear trains, so that the system utilizes too much power for practical utilization in a watch.

Another system which has been proposed and which has been used in clocks is to utilize a high-frequency piezoelectric crystal oscillator whose frequency is reduced by a series of count-down (dividing) circuits. The output of the dividing circuits is then utilized to drive a motor or to control a driving circuit.

It is the objective of the present invention to provide a horological instrument which is highly accurate, regardless of its physical position, and which is relatively rugged and low in cost.

It is a further objective of the present invention to provide a watch which is relatively small in size, highly accurate, relatively less subject to noticeable error or stoppage due to shocks, and which is sufficiently low in power consumption to operate from a small battery cell within the case of the watch.

In accordance with the present invention, a horological instrument is provided which utilizes a piezoelectric crystal oscillator as its time base. The piezoelectric crystal oscillator preferably is sufficiently small in size so that it fits within the case of the instrument. The instrument preferably is a watch and the crystal oscillator has a frequency of above 10,000 Hz., for example, 60,000 Hz. The high frequency of the oscillator is reduced by a plurality of count-down (dividing) circuits, preferably utilizing solid-state low energy transistors such as metal oxide field effect transistors.

The horological instrument also includes a separate electronic circuit for the driving of an oscillator. Preferably the oscillator is a balance wheel which carries a coil and which swing through the field of a plurality of magnets which are fixed on the plate of the instrument. The magnets establish three magnetic fields of alternative polarities such as north-south-north fields, although a magnet establishing only two magnetic fields may alternatively be utilized.

Alternatively, the magnets may be carried by the balance wheel and the coil fixed on the plate of the instrument. In the preferred system a single coil, carried by the balance wheel, performs the functions of a drive means for swinging the balance wheel, by its interaction with the magnetic fields, and as a pick-up means for timing the driving pulse. The circuitry for driving the balance wheel is known from Zemla's U.S. Pat. 3,046,460, and particularly the circuit of FIG. 4 and a suitable physical system of the balance wheel and magnets are also known from that patent, at FIGS. 1–3, 8–10 and 13–16.

The pulses which are derived from the count-down circuits are utilized to synchronize the normal operation of the electronic horological movement. The pulses preferably are at a relatively high rate in relationship to the normal oscillations. For example, the output pulses of the count-down circuits may be at 48 Hz. and the normal oscillations of the balance wheel at 3 Hz. This relatively high synchronization rate lessens the number of count-down circuits. The oscillator, i.e., the balance wheel, carries a pin which indexes, either directly or indirectly, by means of a fork mechanism, the first of a series of wheels which rotate the hands of the watch. This type of balance wheel pin take-off system is conventional in watches and has proven to be reliable and rugged by years of usage.

The instrument is highly accurate because of its synchronization with the piezoelectric oscillator. Yet it is: (1) relatively resistant to shocks because of the pin and fork power take-off system of the balance wheel; (2) relatively low in cost because many of the parts (banlance wheel, drive circuit, dial train, etc.) may be the same as, or similar to, parts used in relatively inexpensive and only moderately accurate electric watches; and (3) relatively low in power consumption; as the watch will operate almost accurately without synchronization, its synchronization requires little power Other objectives of the present invention will be apparent from the below-described preferred embodiment taken in conjunction with the accompanying drawings, in which:

Figure 1:
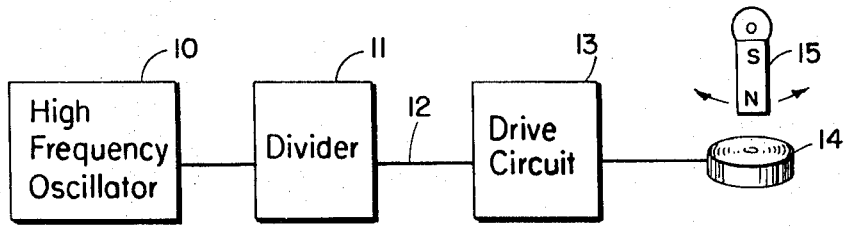
FIG. 1 is a block schematic diagram of the circuit of the electronic watch of the present invention.

As shown in FIG. 1, the circuitry for the electronic watch consists of a number of subcircuits. The time base is a high-frequency oscillator 10. Preferably the high-frequency oscillator is an electronic piezoelectric crystal oscillator whose frequency is above 10,000 Hz. The high-frequency pulse rate from oscillator 10 is divided down by the divider circuit 11. The divider circuit 11 may be, for example, a series of flip-flop circuits in tandem. Alternatively, the dividing circuit 11 may be a plurality of relaxation oscillators having selected time constants. For example, the relaxation oscillators may be cascaded in tandem (in series) and divided by ratios of 7:1, 7:1 and 7:1. The frequency which has been reduced is supplied, by means of line 12, to the drive circuit 13 of the watch. The drive circuit 13 is synchronized by the output of the divider and, even in the absence of synchronization, provides a driving output pulse. The drive circuit supplies a drive pulse to a coil 14 which physically interacts with a magnet 15. Either the coil 14 or the magnet 15 may be carried by the balance wheel of the watch.

Figure 2:
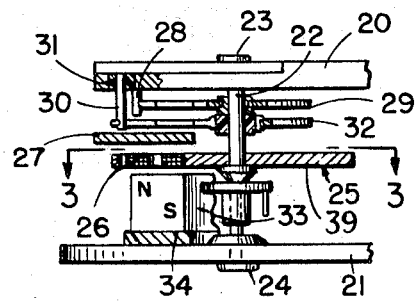
FIG. 2 is a side cut-away view of the watch.

The physical embodiment of the watch of the present invention is shown in FIG. 2. It consists of a watch movement having an upper plate 20 and a bottom plate 21 which are spaced apart. A balance wheel staff 22 rotates between a bearing 23 in the upper plate 20 and a bearing 24 in the lower plate 21. The balance wheel staff 22 carries balance wheel 25. An electric coil 26, of round, trapezoidal or other shape, consisting of many turns of fine wire, is carried by the balance wheel 25. A shunt 27, of soft magnetic material such as steel, is positioned above the balance wheel. The shunt 27 is carried by one of the plate members of the watch.

A stud 28 is fixed to the plate 20 and a first hairspring 29, at its outer end, is fixed within the stud 28. The inner end of the hairspring 20 is fixed to a hub fixed on the balance wheel staff 22. There is an electrical connection, for example, by means of a wire, from the hub or spring 29, to one end of the coil 26. A second stud 30 is fixed within insulating material 31 in the upper plate 20. A second hairspring 32 is connected, at its outer end, to the stud 30 and is connected at its inner end to an insulated second hub fixed on the balance wheel staff 22. A wire leads from the hairspring 32 to the opposite end of the coil 26. The coil is electrically connected, by means of the hairsprings 29 and 32, to the respective studs 28 and 30. The studs 28 and 30 serve as electrical terminals of the coil.

Figure 3:
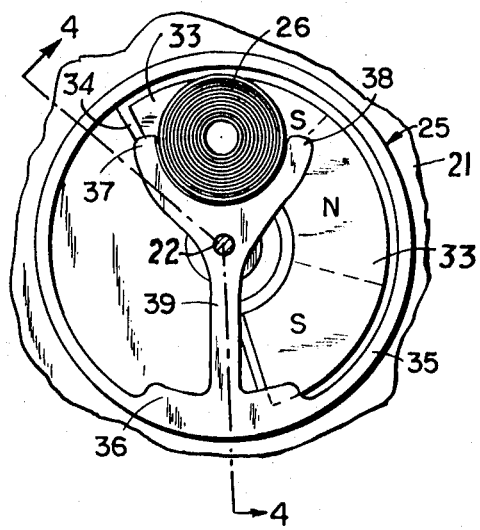
FIG. 3 is a cross-sectional view taken along line 3—3 of FIG. 2.
Figure 4:
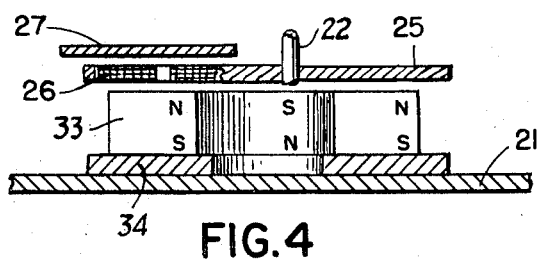
FIG. 4 is a cross-sectional view taken along line 4—4 of FIG. 3.

A magnet structure 33 is positioned below the balance wheel. Preferably the magnet structure is positioned on a lower shunt plate 34, of soft magnetic material, which is fixed to the lower plate 21. The magnet, as shown in FIGS. 2, 3 and 4, is preferably a single piece of ceramic magnetic material which is magnetized in the axial direction to form, in effect, three magnets, creating three magnetic fields through which the coil oscillates. As shown, the magnetic fields are arranged at the top face of the magnet north-south-north and at the bottom face (against the bottom shunt) south-north-south.

As shown in FIG. 3, the balance wheel 25 consists of an outer rim portion 35 having a widened portion 36 for poising and counterbalancing. The coil 26 is held between extending arms 37 and 38 which are integral with the spoke 39 of the balance wheel.

Figure 5:
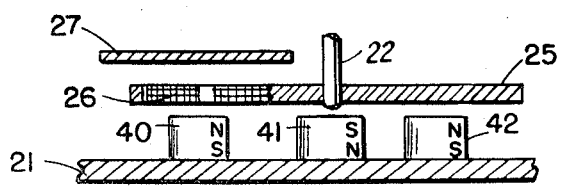
FIG. 5 is a cross-sectional view of an alternative magnet arrangement.

In the embodiment of FIG. 5, the coil 26 is carried by the balance wheel 25 beneath the shunt 27. The three magnetic fields are created by three separate magnets 40, 41 and 42, which are axially magnetized to form, at their free top sides, respectively north-south-north fields. The lower shunt is eliminated and the magnets 40, 41 and 42 are fastened directly on the lower plate 21, which is of a non-magnetic material such as brass.

An alternative construction is to utilize only the two magnets 40 and 41 and not use the magnet 42.

Figure 6:
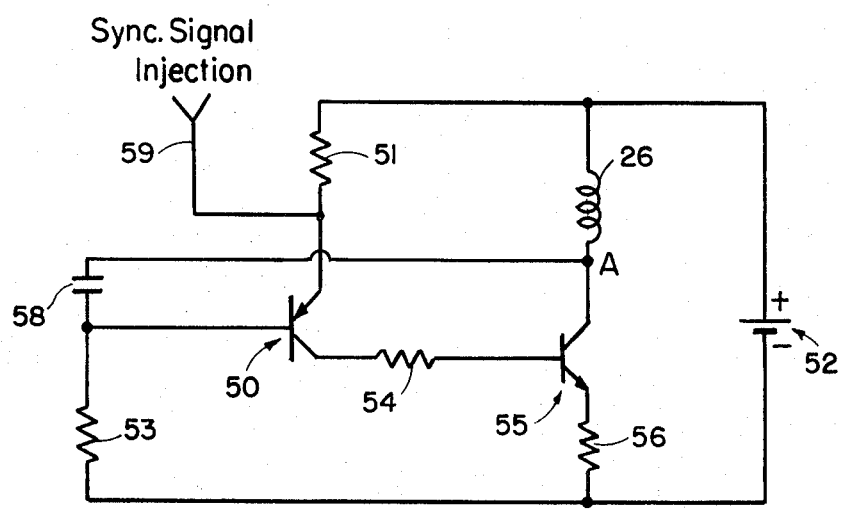
FIG. 6 is a schematic view of the drive circuit of the present invention.

The drive circuit of the watch of the present invention is shown in FIG. 6. The circuit of FIG. 6 is a relaxation oscillator utilizing two complementary transistors. A PNP transistor 50 is connected, through resistor 53, to the negative terminal of the battery 52. The collector of transistor 50 is connected, through resistor 54, to the base of NPN transistor 55. The emitter of the NPN transistor 55 is connected, through resistor 56, to the negative terminal of the battery 52. The collector of transistor 55 is connected to junction point A and to the coil 26. The opposite end of the coil is connected to the resistor 51. The point A is connected through capacitor 58 to the base of transistor 50. The synchronization signal is injected on line 59 to the emitter of transistor 50. The coil 26, as previously described, oscillates through a plurality of magnetic fields. The coil performs two functions, namely, it acts as a pick-up (timing) means and as a driving means. When current flows through the coil, the coil causes the physical oscillation of the balance wheel. Movement of the coil into the fields of the magnets causes a back E.M.F., which is utilized to trigger the driving pulse.

The driving circuit of FIG. 6 is preferably triggered by three independent sources, which are as follows: (1) The back E.M.F. induced in coil 26, by its physical motion into the fields of the magnet, acts through capacitor 58 to change the voltage at the base of transistor 50. That change of voltage turns on transistor 50, which turns on transistor 55 and causes current to flow from the battery through the coil 26. A regenerative action causes the duration of the output driving pulse from transistor 55 to be independent of the back E.M.F. After the back E.M.F., in effect, is swamped by the forward current, the forward current will continue for a time period determined by the timing components of the circuit, particularly by the capacitor 58 and the resistor 51. (2) The circuit is independently triggered for the self-starting of the watch. The circuit is self-oscillating, due to the connection of the base of transistor 50 through resistor 53 to the negative terminal of the battery 52. Even in the absence of movement of the balance wheel, a train of pulses will be produced to start such movement. (3) The circuit produces a triggered pulse due to the synchronization pulse received on line 59. The synchronization signal injected on line 59 is added to what would normally be an insufficient amount of back E.M.F. voltage induced in the current to produce a trigger pulse. The synchronization signal is set so that it alone (in the absence of back E.M.F.) would not be sufficient to trigger the driving circuit.

Consider a mechanical oscillator with some losses (damping), characterized by its undamped natural frequency $\omega_0$ and a damping ratio $\zeta$ (ratio of actual to critical damping). If a single short impulse is imparted to the oscillator, it will execute a sinusoidal oscillation at the damped frequency $\omega_1=\omega_0\sqrt{1-\zeta^2}$ with exponentially decaying amplitude. To maintain constant amplitude, a short impulse (duration of impulse short in comparison with the period of oscillation) is applied during each cycle. The point in the cycle, at which the impulse is applied, is important. Only if the impulse occurs at the neutral point (zero displacement, maximum velocity), will the frequency remain at $\omega_1=\omega_0\sqrt{1-\zeta^2}$. If the impulse occurs earlier, the frequency increases; if it occurs later, it decreases. If $\alpha$ denotes the phase angle at which the impulse occurs, then, for small values of $\varphi$, the change in frequency is given by: $\Delta\omega/\omega=\varphi\zeta$. For example, if $\varphi=3$ degrees$=0.05$ radian and $$\zeta=\frac{1}{2Q}=0.01$$

(a value believed to be realistic for a balance wheel), then $\Delta\omega/\omega=0.0005$, equivalent to 43 seconds/day.

Figure 7:
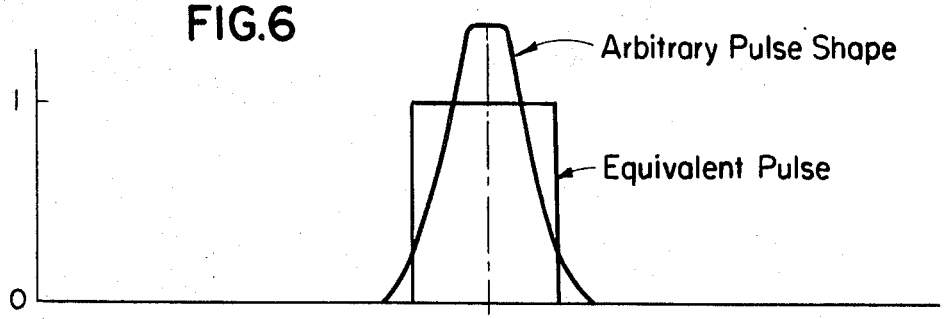
FIGS. 7, 7A and 7B are diagrams utilized in analyzing the drive system of the present invention.

As long as $\varphi$ is small (i.e. cos $\varphi$ nearly equal to unity) and the pulse duration is short compared to the period, a pulse of arbitrary shape and duration may be replaced, for purposes of analysis, by an equivalent rectangular pulse of unity height and having the same area as the original pulse (FIG. 7). Two rectangular pulses $P_1$ and $P_2$ occurring at $\varphi_1$ and $\varphi_2$, and having widths $W_1$ and $W_2$, respectively, may be replaced by a single pulse $P_3$ which has the same moment about the point $\varphi=0$ as the two original pulses.

$$W_3=W_1+W_2$$

$$W_3\varphi_3=W_1\varphi_1+W_2\varphi_2$$

$$\varphi_3=\frac{W_1\varphi_1+W_2\varphi_2}{W_1+W_2}$$

Figure 7A:
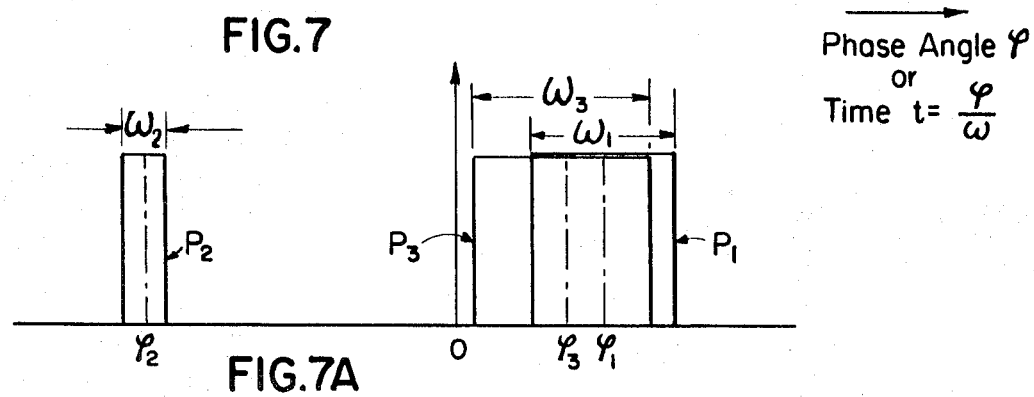
Figure 7B:
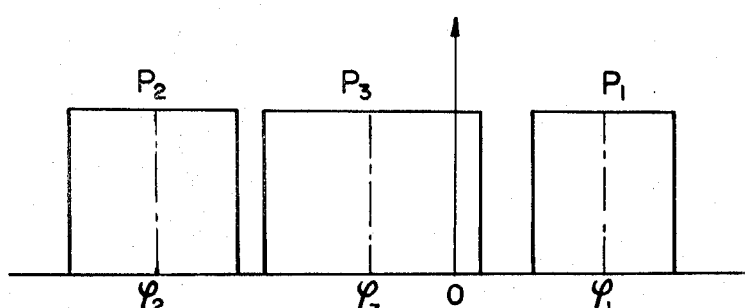

If pulse $P_1$ remains constant, and $P_2$ is varied in width $W_2$ and/or position $\varphi_2$, the position of $\varphi_3$ of $P_3$ is shifted. This is illustrated in FIGS. 7A and 7B.

Figure 8:
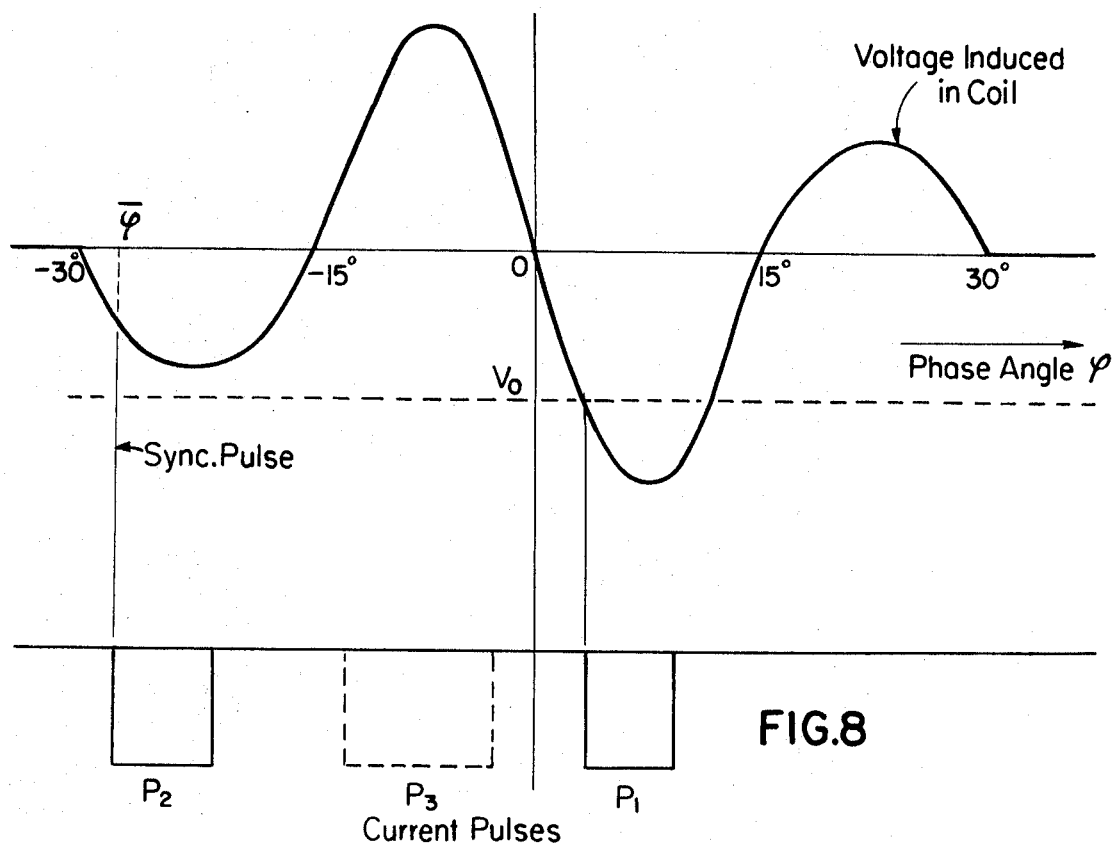
FIG. 8 is a diagram of the voltage induced in the coil and the current wave froms theoretically produced at the output of the circuit of FIG. 6.

In the watch described above, a coil mounted on the balance wheel passes successively over three magnet poles of alternate polarity. The voltage induced in the coil as a function of the phase angle is depicted in FIG. 8. The drive circuit (FIG. 6) exhibits regenerative action. When the voltage at point A dips even momentarily below the value $V_0$ (FIGS. 8 and 11), both transistors are turned on and a current pulse is sent through the coil. The current remains on, until the slope of the voltage curve reaches a certain positive value.

Without synchronization, only pulse $P_1$ is present and the watch runs at a rate determined by the constants of the balance wheel. When a sync pulse is injected on line 59, pulse $P_2$ appears in addition to $P_1$. The net effect of both pulses is represented by an equivalent pulse $P_3$. It can be seen that $P_3$ occurs at a negative value of $\varphi$ that is, before the neutral position, and therefore accelerates the watch. Furthermore, the position of $P_3$ is dependent upon the point $\overline{\varphi}$, at which the sync pulse is injected. If the watch normally runs slow by a large amount, $\overline{\varphi}$ is nearly $-30°$, $P_2$ is wide, and $P_3$ is shifted to the left. If the watch is only slightly slow, $P_2$ is narrow and $P_3$ is almost identical with $P_1$. If the watch runs fast, the sync pulse gives rise only to a very narrow (1 microsecond) pulse $P_2$ which has no effect, and there is no synchronization.

Therefore, the watch is initially made to run somewhat slow (without synchronization) so that introduction of the pulse keeps the balance wheel in step with the sync pulse, which, in turn, is controlled by the crystal oscillator. If, for any reason, synchronization is momentarily lost, the watch continues to run at a slower rate until the sync pulse again occurs in the position shown in FIG. 8. The loss of time at 48 Hz. with a 3 Hz. balance wheel amounts to about $\frac{1}{48}$ of a second.

Figure 9A:
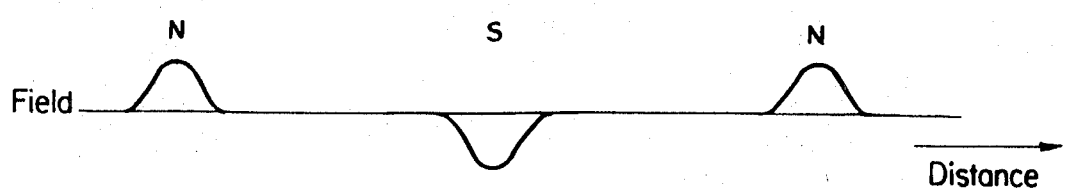
FIG. 9A is a diagram of the fields of the magnets.
Figure 9B:
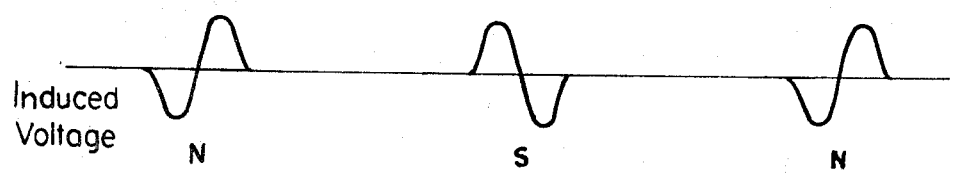
FIG. 9B is a diagram illustrating the voltages induced in the coil by those fields.
Figure 10A:
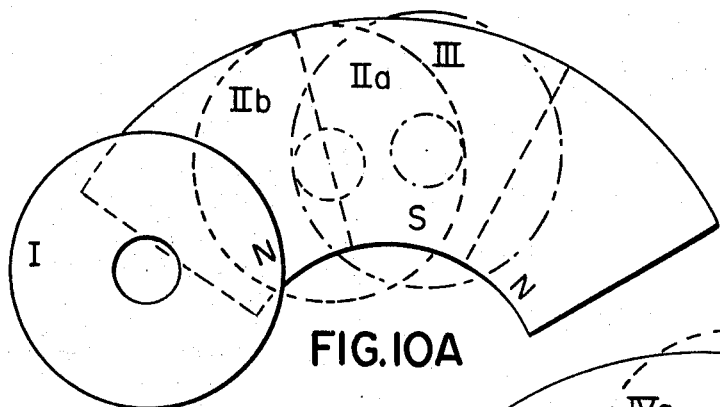
FIGS. 10A and 10B are top plan views of the magnet structure showing the positions of the coil as it moves through the magnetic fields.
Figure 10B:
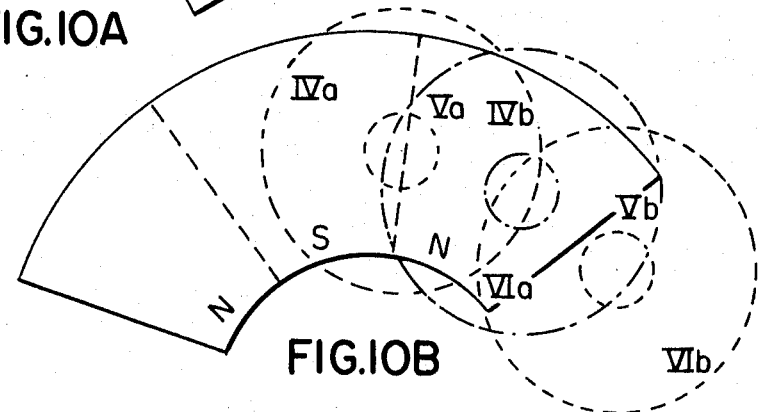
Figure 11:
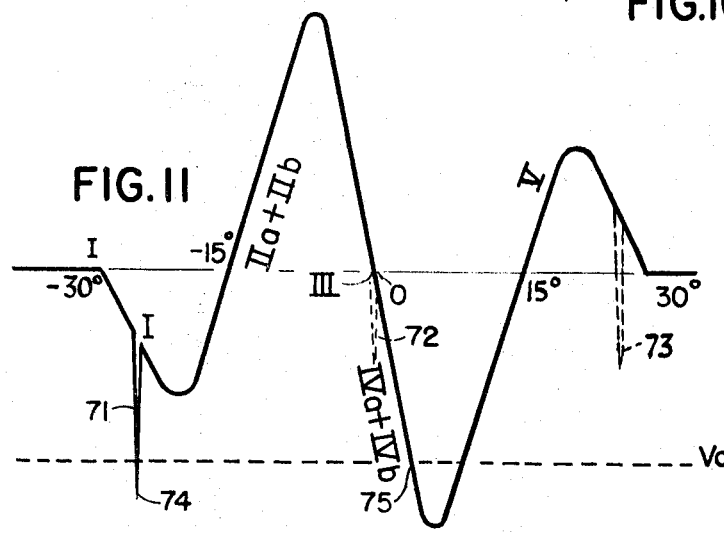
FIG. 11 is a diagram illustrating the combined voltages induced in the coil.

The three magnets provide north-south-north magnetic fields, shown in FIG. 9A, through which the coil moves. The back E.M.F. voltage is plotted in FIG. 9B wherein it is assumed that the fields are widely spaced apart. In fact, the magnetic fields are closely next to one another so that the back E.M.F. voltages are combined. The various positions of the coil 26 as it moves through the magnetic fields are shown in FIGS. 10A and 10B, there being only one magnetic structure but two figures 10A and 10B, only to make the illustration clearer. The positions of the coil at sequential times are I, II, III, IV and V, with III being the central position when the coil is directly over the center magnet. The forward arm of the coil is labeled $a$ and the following arm $b$. The FIG. 11 shows the back E.M.F. which is the algebraic addition of the voltages induced in the coil by the magnetic fields. For example, the rising portion labeled $IIa+IIb$ indicates that the voltage rises when the forward arm of the coil moves into position $IIa$ and the following arm of the coil moves into position $IIb$ (the physical position II is shown in FIG. 9A).

The synchronization pulses 71, 72 and 73 occur at a high rate compared to the oscillation of the balance wheel. For example, a synchronization rate of 48 Hz. is preferably employed with a balance wheel oscillating at 3 Hz. Assuming that the balance wheel oscillates 210° in each direction (i.e., a complete swing in both directions of 840°), then $$\frac{3\times 840}{48}=\sim 52°$$

which is the spacing of the synchronization pulses. The synchronization pulses 72 and 73 are not of any effect. However, the pulse 71, when algebraically added to the back E.M.F., falls belowe $V_0$ (at point 74) and triggers the driving circuit. The driving circuit is again triggered, without the aid of a synchronizing pulse, at point 75. The drive circuit causes a driving pulse to the coil twice in each direction of oscillation, i.e., four times in each full oscillation or 12 times a second utilizing a 3 Hz. balance wheel.

If the balance wheel slows down, the triggering, at point 74 in FIG. 11, will still be sufficient, even with the decreased back E.M.F., to trigger the drive circuit and restore the correct velocity of the balance wheel. As mentioned above, the duration of the pulse depends upon the rising voltage attaining a certain positive value. That value is attained sooner, i.e., a shorter pulse width, when the velocity of the balance wheel is too large.

Figure 12:
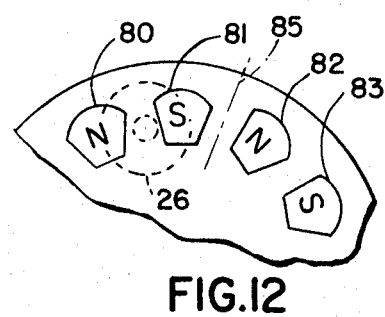
FIG. 12 is a top view of an alternative magnet structure.
Figure 13:
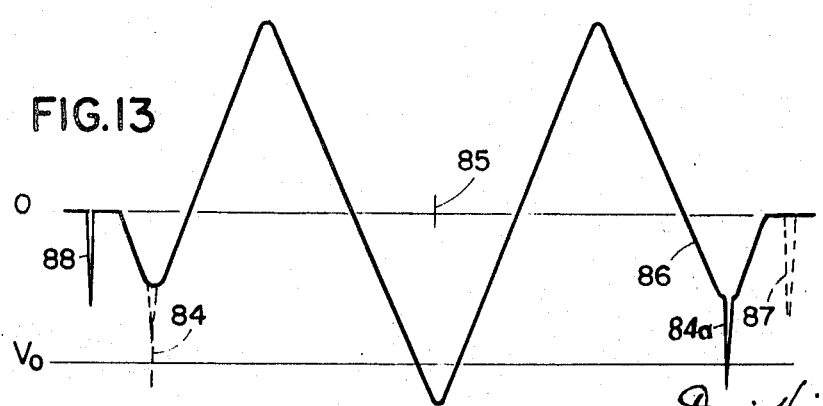
FIG. 13 is a diagram of the voltages induced in a coil by the structure of FIG. 12.

The embodiment of FIGS. 12 and 13 utilizes at least four magnetic fields. This embodiment provides for synchronization, as in the prior embodiment, which accelerates the balance wheel. This embodiment also provides synchronization which may decelerate the balance wheel.

The embodiment of FIG. 12 utilizes four evenly spaced magnets 80, 81, 82 and 83 which are axially poled parallel to the axis of the balance wheel staff. The coil 26 embraces two of the magnet faces simultaneously. The back E.M.F. voltage wave form is shown in FIG. 13. Normally, the synchronous pulse 84 would provide an acceleration to the balance wheel as it occurs before the central line 85. The synchronizing rate is selected so that, sorvld the balance wheel have too high a velocity, a synchronizing pulse 84a will occur on the third negative voltage excursion 86 of the wave form. The driving circuit will be turned on at a time which effectively decelerates the balance wheel. Normally, the decelerating synchronizing pulse occurs past the negative excursion 86 and 87 and has no effect upon the system. The accelerating synchonous pulse, in the event that the balance wheel has too high a velocity, occurs at 88, i.e., before the first negative excursion of the wave form, and does not trigger the driving pulse.

The synchronous system of the present invention permits the watch designer greater freedom in designing the watch. For example (1) the magnets may be placed on the balance wheel and two fixed coils used, one for pickup and one for driving; (2) the amplitude of oscillation of the balance wheel may be decreased as the balance wheel does not determine the timekeeping; (3) the synchronizing frequency may be selected at an even multiple of the balance wheel.

Figure 14:
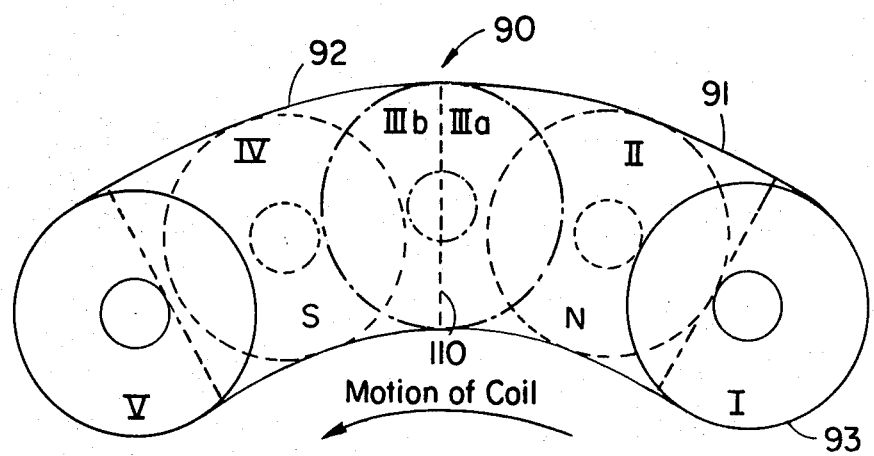
FIG. 14 is a top plan view of the alternative magnet structure using two magnets, the drawing showing the positions of the coil as it moves through the magnetic fields.

In the embodiment of FIG. 14, the magnet 90 is a ferroelectric ceramic magnet fixed to the frame plate or a shunt and having two axially poled zones, although other types of magnets creating two oppositely poled magnetic fields may be used. As seen in the top view of FIG. 14, the magnetic zones are a north magnetic pole 91 and a south magnetic pole 92. This magnet is utilized with the same synchronization circuit as described in connection with FIG. 1 and may be used with the same physical structure as is described in connection with FIGS. 2, 3, 4 and 5. At coil 93 is carried, similarly to the coil 26 of FIG. 3, by the balance wheel of the watch. In FIG. 14 the coil 93 is shown in five positions, designated I, II, III, IV and V. In position I, the forward half of the coil is over the north magnet 91. In position III the center line of the coil coincides with the center of the magnet 90 so that the coil 93 is both over the south magnet 92 (designated IIIb) and the north magnet 91 (designated IIIa). In position IV the coil 93 is principally over the south magnet 92 and in position V the coil 93 has its following side over the south magnet 92.

The term "forward movement," as used herein, means a clockwise motion, when viewed as in FIG. 14 (looking down on the coil and magnets). The term "return movement" means the counterclockwise motion. The return movement is illustrated in FIG. 14.

Figures 15A, 15B:
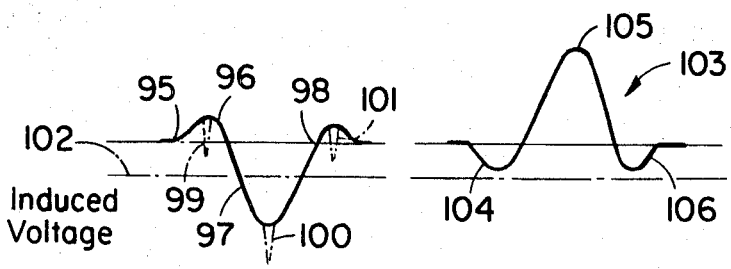
FIG. 15 is a diagram illustrating the voltages on the forward and return movement of the coil using the two-magnet structure of FIG. 14.

During the forward movement, a voltage, of the approximate form of waveform 95, shown in FIG. 15A, is induced in the coil. The waveform 95 includes a first rising portion 96, a descending negative going portion 97, which triggers the drive pulse, and a second rising portion 98. The synchronizing pulses, which may be 99 in portion 96, 100 in portion 97, and 101 in portion 98, have no effect. They do not cause any portion of the waveform to be shifted, and do not cause the addition or subtraction of any drive pulses. In other words, the induced voltage, during forward motion, algebraically added to the synchronizing pulses, does not fall below the negative going voltage (indicated by dot-dash line 102) necessary to turn on (trigger) the drive circuit.

The induced voltage, during the return motion, is utilized to synchronize the watch. That induced voltage 103, shown in FIG. 15B, consists of a first small negative portion 104, a large positive portion 105, and a second small negative portion 106. None of these are below the trigger voltage line 102 and none, in the absence of a synchronizing pulse, would trigger the drive circuit.

Figures 16A, 16B:
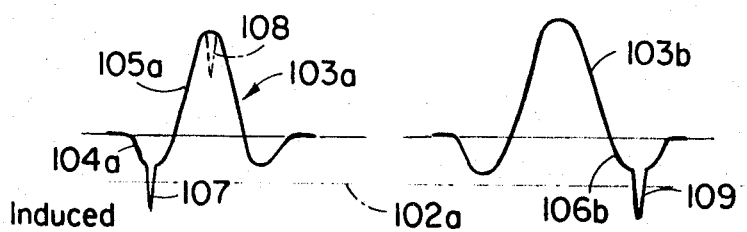
FIG. 16 is a diagram indicating the induced voltages, and their synchronization, during two different return movements of the coil, utilizing the two-magnet structure of FIG. 14.

FIG. 16 illustrates the induced voltage on the return movement. In FIG. 16A the waveform 103a has, as its first negative portion 104a, a synchronizing pulse 107 algebraically added to it. The combination of pulse 107 and portion 104a is sufficiently negative to fall below the trigger line 102a. The drive circuit is triggered and a current drive pulse is produced. The induced portion 104a, and the resulting drive pulse, occurs when the coil is entering the magnets, i.e., when the coil is in positions I and II (over the N magnet 91) and before the center line 110. Consequently, the extra added drive pulse, when the coil is in that position, acts to accelerate the coil, the driving force being in the counterclockwise direction, aiding the counterclockwise direction of motion.

The synchronizing pulse should, if the balance wheel frequency were exact, occur in portion 105a. Such a synchronizing pulse 108 would not have any effect in that it would not cause an extra drive pulse.

As shown in FIG. 16B, the induced waveform 103b, when the coil is too fast, is the same as in the FIG. 16A. However, the synchronizing pulse 109 occurs in portion 106b and algebraically adds to that portion, dropping the total voltage below trigger line 102a and thereby triggering the drive circuit. The portion 106b, and the resulting drive pulse, occurs when the coil 93 is over the S magnet 92, in positions IV and V. The drive pulse, when it occurs at an instant when the coil is past the center line 110 (which is between magnets 91 and 92) acts to retard the return motion of the coil and thereby slows down the balance wheel.

Figure 17:
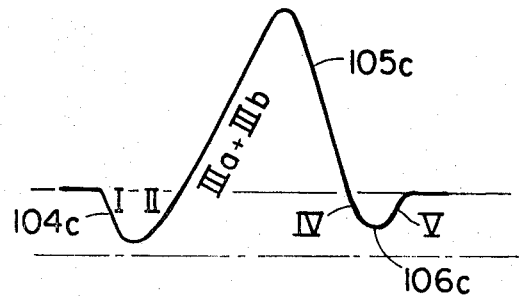
FIG. 17 is a diagram illustrating the combined voltages induced in the coil by the two-magnet structure of FIG. 14.

As shown in FIG. 17, the induced waveform on the return movement consists of a first negative portion 104c corresponding to the positions I and II of the coil, a positive portion 105c corresponding to the coil positions IIIa and IIIb, and a second negative portion 106c corresponding to coil positions IV and V.

In this embodiment, as in the prior embodiments, the magnets may be carried by the balance wheel and the coil may be fixed to the base plate. Also, as in the other embodiments, the drive circuit is a regenerative multivibrator so that any width or shape of input triggering pulse is sufficient to trigger a drive pulse output. Preferably the circuit is a relaxation oscillator, or other type of astable multivibrator, using a complementary pair of transistors.

What is claimed is:

1. A horological instrument including a power source, a high frequency oscillator as its time base, a dividing circuit to reduce the frequency of said time base, a low frequency mechanical element carrying one of an interacting coil and magnetic means and capable of oscillation, said low frequency mechanical element comprising a balance wheel fixed on a balance wheel staff and said coil comprising a single coil and said magnetic means including three magnets alternatively poled in the axial direction of the balance wheel staff, the magnetic means establishing at least two magnetic fields of alternate polarities for pulsing said coil and causing oscillation of said mechanical element, a drive circuit connected to said power source, the output of said drive circuit being connected to said coil and said drive circuit being connected to and synchronized by said dividing circuit, and a time display means operated by said low frequency mechanical element.

2. A horological instrument as in claim 1 wherein said drive circuit is a relaxation oscillator utilizing a complementary pair of transistors.

3. A horological instrument as in claim 1 wherein the low frequency mechanical element is a balance wheel fixed on a balance wheel staff, said coil is a single coil and said magnetic means includes four magnets.

4. A horological instrument as in claim 1 wherein said coil is a single coil carried by the balance wheel.

5. A horological instrument including a power source, a high frequency oscillator as its time base, a dividing circuit to reduce the frequency of said time base, a low frequency mechanical element carrying one of an interacting coil and magnetic means, said means pulsing said coil, and said elements being capable of oscillation, a drive circuit connected to said power source, the output of said drive circuit being connected to said coil and said drive circuit being connected and synchronized by said dividing circuit, and a time display operated by said low frequency mechanical element, wherein said drive circuit is a regenerative multivibrator.

6. An instrument as in claim 5 wherein the drive circuit is an astable multivibrator.

7. A horological instrument as in claim 5 wherein the low frequency mechanical element is a balance wheel fixed on a balance wheel staff, said coil is a single coil and said magnetic means includes three magnets alternatively poled in the axial direction of the balance wheel staff.

8. A horological instrument as in claim 5 wherein said drive circuit is a relaxation oscillator utilizing a complementary pair of transistors.

9. A horological instrument as in claim 5 wherein said high frequency oscillator is a piezoelectric crystal oscillator.

10. A horological instrument as in claim 5 wherein the low frequency oscillator is a balance wheel fixed on a balance wheel staff, said coil is a single coil and said magnetic means includes four magnets.

11. A horological instrument as in claim 5 wherein said coil is a single coil carried by the balance wheel.

12. A horological instrument as in claim 5 wherein the output of said dividing circuit is algebraically added to the back electromotive force induced in said coil by said magnetc means to produce an actuating pulse, said actuating pulse causing said drive circuit to produce a driving pulse.

13. A horological instrument as in claim 12 wherein said actuating pulse occurs before or after a main driving pulse, whereby the drive circuit produces at least two driving pulses for each oscillation of the mechanical element.

14. A horological instrument including a power source, a high frequency oscillator as its time base, a dividing circuit to deduce the frequency of said time base, a low frequency mechanical element carrying one of an interacting coil and two oppositely poled magnets, said magnets pulsing said coil, sad element being capable of oscillation, a regenerative multivibrator drive circuit connected to said power source, the output of said drive circuit being connected to said coil and said drive circuit being connected and synchronized by said dividing circuit, and a time display operated by said low frequency mechanical element, wherein the output of said dividing circuit is algebraically added to the back electromotive force induced in said coil by said two magnets to produce an actuating pulse, said actuating pulse causing said drive circuit to produce an additional driving pulse on the return movement of said oscillatory element only when its movement is not in synchronization with said high frequency oscillator.

15. An instrument as in claim 14 wherein the drive circuit is an astable multivibrator.

16. A horological instrument as in claim 14 wherein the low frequency mechanical element is a balance wheel fixed on a balance wheel staff, said coil is a single coil and said magnets are poled in the axial direction of the balance wheel staff.

17. A horological instrument as in claim 14 wherein said drive circuit is a relaxation oscillator utilizing a complementary pair of transistors.

18. A horological instrument as in claim 14 wherein said high frequency oscillator is a piezoelectric crystal oscillator.

19. A horological instrument as in claim 14 wherein said coil is a single coil carried by the balance wheel.

References Cited

UNITED STATES PATENTS

| | | | |
|---|---|---|---|
| 3,063,233 | 11/1962 | Bly | 58—35 X |
| 3,292,064 | 12/1966 | Watters | 318—127 |
| 3,451,210 | 6/1969 | Helterline, Jr. et al. | 58—26 |

RICHARD B. WILKINSON, Primary Examiner

E. C. SIMMONS, Assistant Examiner

U.S. Cl. X.R.

318—130; 331—153